(12) United States Patent
Tangeland et al.

(10) Patent No.: US 9,769,419 B2
(45) Date of Patent: Sep. 19, 2017

(54) CAMERA SYSTEM FOR VIDEO CONFERENCE ENDPOINTS

(71) Applicant: Cisco Technology, Inc., San Jose, CA (US)

(72) Inventors: Kristian Tangeland, Oslo (NO); Knut Helge Teppan, Asker (NO); Andre Lyngra, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/870,274

(22) Filed: Sep. 30, 2015

(65) Prior Publication Data
US 2017/0094222 A1 Mar. 30, 2017

(51) Int. Cl.
*H04N 7/14* (2006.01)
*H04N 5/225* (2006.01)
*H04N 5/247* (2006.01)
*H04N 7/15* (2006.01)

(52) U.S. Cl.
CPC ........... *H04N 7/147* (2013.01); *H04N 5/2252* (2013.01); *H04N 5/247* (2013.01); *H04N 7/142* (2013.01); *H04N 7/15* (2013.01)

(58) Field of Classification Search
USPC ............................................ 348/14.01–14.09
See application file for complete search history.

(56) References Cited

U.S. PATENT DOCUMENTS

| 7,349,005 B2 * | 3/2008 | Rui ........................ H04N 7/181 348/14.11 |
| 7,561,191 B2 | 7/2009 | May et al. |
| D616,007 S | 5/2010 | Teppan et al. |
| D636,421 S | 4/2011 | Sagen et al. |

(Continued)

FOREIGN PATENT DOCUMENTS

| CN | 104054020 A | 9/2014 |
| TW | 201335689 A1 | 9/2013 |

(Continued)

OTHER PUBLICATIONS

Ryan Kim, "Altia Systems makes video conferencing panoramic", Gigaom, https://gigaom.com/2012/11/13/altia-systems-makes-video-conferencing . . . , Nov. 13, 2012, 6 pages.

(Continued)

*Primary Examiner* — Maria El-Zoobi
(74) *Attorney, Agent, or Firm* — Edell, Shapiro & Finnan, LLC

(57) ABSTRACT

A camera system for a video conference endpoint includes a fixed wide lens camera providing a view of a space, a first fixed camera providing a view of a first portion of the space, a second fixed camera providing a view of a second portion of the space, a third fixed camera providing a view of a third portion of the space, and a processor operatively coupled to each of the cameras. Each of the cameras is configured to produce a video signal and the processor is configured to receive the video signals and select a relevant video signal from the video signals. The processor is also configured to (Continued)

process the relevant video signal by digitally panning, tilting, and zooming of the relevant video signal to generate a video stream from the processed video signal.

20 Claims, 15 Drawing Sheets

(56) References Cited

U.S. PATENT DOCUMENTS

| | | | |
|---|---|---|---|
| 8,319,814 B2 | 11/2012 | King et al. | |
| 8,537,195 B2 | 9/2013 | Duckworth et al. | |
| 8,730,299 B1* | 5/2014 | Kozko | H04N 5/2254 |
| | | | 348/38 |
| 8,731,390 B2 | 5/2014 | Goldenberg et al. | |
| 8,773,495 B2 | 7/2014 | Saleh et al. | |
| 8,773,498 B2 | 7/2014 | Lindbergh | |
| D710,423 S | 8/2014 | Teppan et al. | |
| 8,890,929 B2 | 11/2014 | Paithankar et al. | |
| D723,089 S | 2/2015 | Teppan et al. | |
| 2002/0140804 A1 | 10/2002 | Colmenarez et al. | |
| 2005/0185047 A1 | 8/2005 | Hii | |
| 2006/0104458 A1 | 5/2006 | Kenoyer et al. | |
| 2006/0274031 A1 | 12/2006 | Yuen et al. | |
| 2007/0070177 A1 | 3/2007 | Christensen | |
| 2007/0206091 A1 | 9/2007 | Dunn et al. | |
| 2010/0123770 A1 | 5/2010 | Friel et al. | |
| 2010/0134635 A1 | 6/2010 | Teppan et al. | |
| 2012/0081506 A1* | 4/2012 | Marvit | H04N 7/15 |
| | | | 348/14.12 |
| 2012/0188420 A1* | 7/2012 | Black | H04N 5/2253 |
| | | | 348/279 |
| 2012/0320143 A1 | 12/2012 | Chu et al. | |
| 2013/0162752 A1 | 6/2013 | Herz et al. | |
| 2014/0049595 A1 | 2/2014 | Feng et al. | |
| 2015/0009278 A1* | 1/2015 | Modai | H04N 7/15 |
| | | | 348/14.08 |
| 2015/0029601 A1 | 1/2015 | Dror et al. | |
| 2015/0085174 A1 | 3/2015 | Shabtay et al. | |
| 2015/0146078 A1 | 5/2015 | Aarrestad et al. | |

FOREIGN PATENT DOCUMENTS

| | | |
|---|---|---|
| WO | 2013/105012 A2 | 7/2013 |
| WO | 2014/083489 A1 | 6/2014 |
| WO | 2014/199338 A2 | 12/2014 |
| WO | 2015/001440 A1 | 1/2015 |
| WO | 2015/001519 A2 | 1/2015 |
| WO | 2015/015383 A2 | 2/2015 |
| WO | 2015/068056 A1 | 5/2015 |
| WO | 2015/068061 A2 | 5/2015 |

OTHER PUBLICATIONS

"Distributed Meetings", Microsoft Research, http://research.microsoft.com/en-us/projects/distributedmeetings/ . . . , downloaded from the internet on Sep. 30, 2015, 4 pages.

Sharif Sakr, "Dual-lens smartphone cameras are coming, and this is why we want one", http://www.engadget.com.com/2014/02/26/corephotonics-dual-lens-smartphon . . . , Feb. 26, 2014, 8 pages.

International Search Report and Written Opinion in counterpart International Application No. PCT/US2016/054048, mailed Dec. 21, 2016, 10 pages.

* cited by examiner

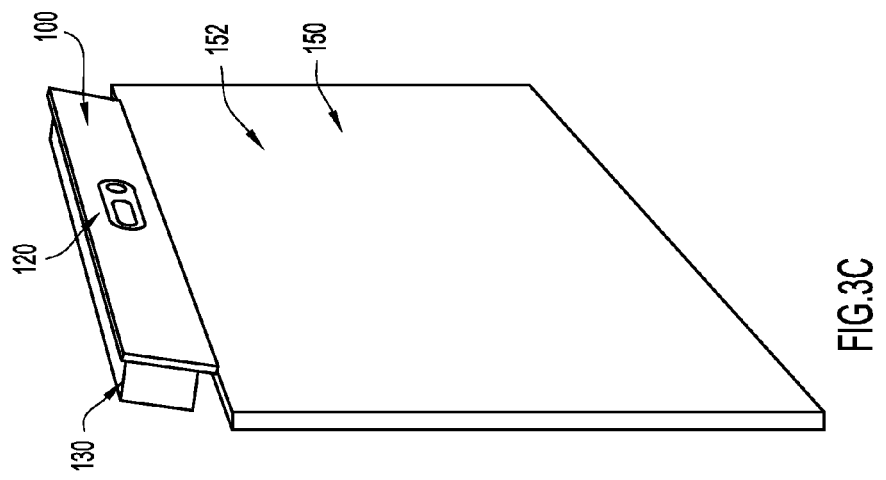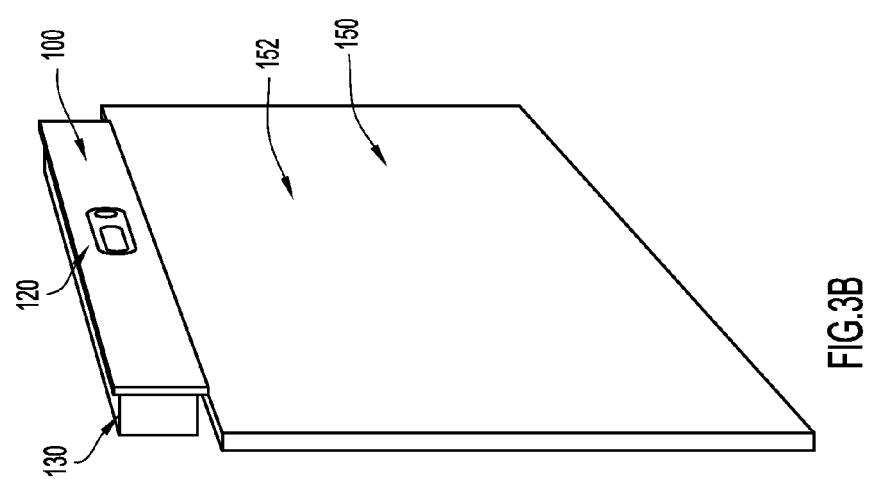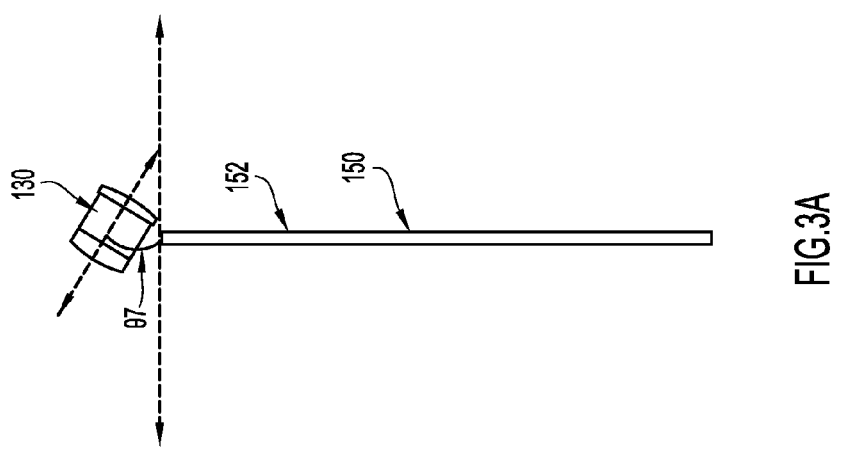

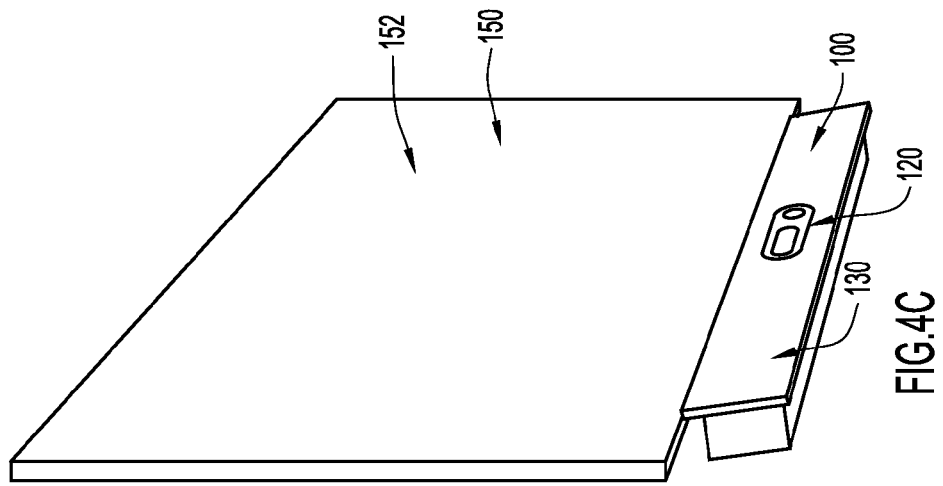
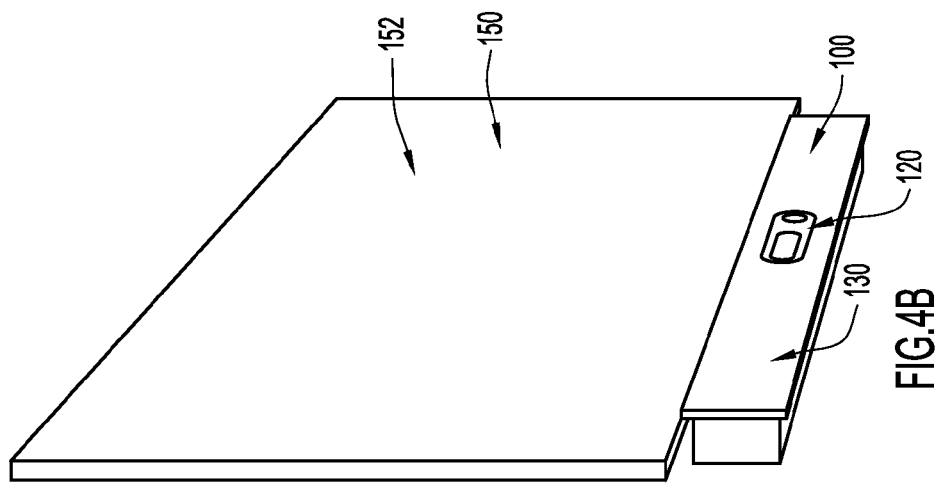
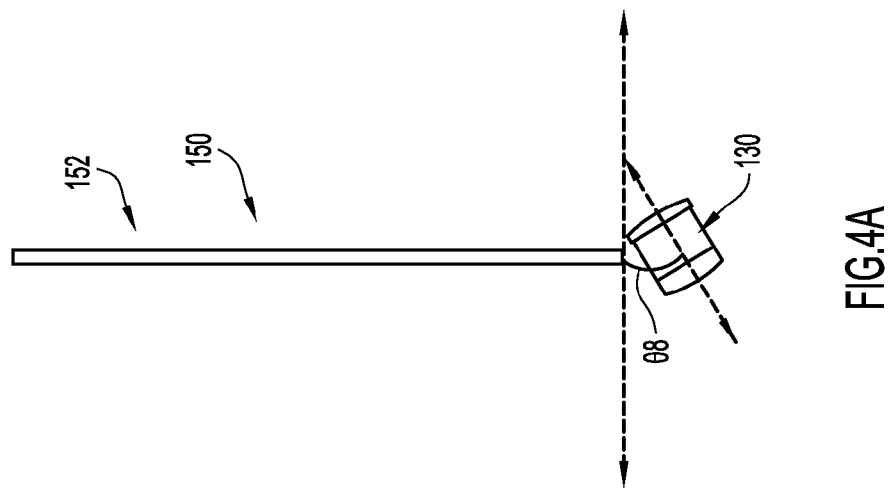

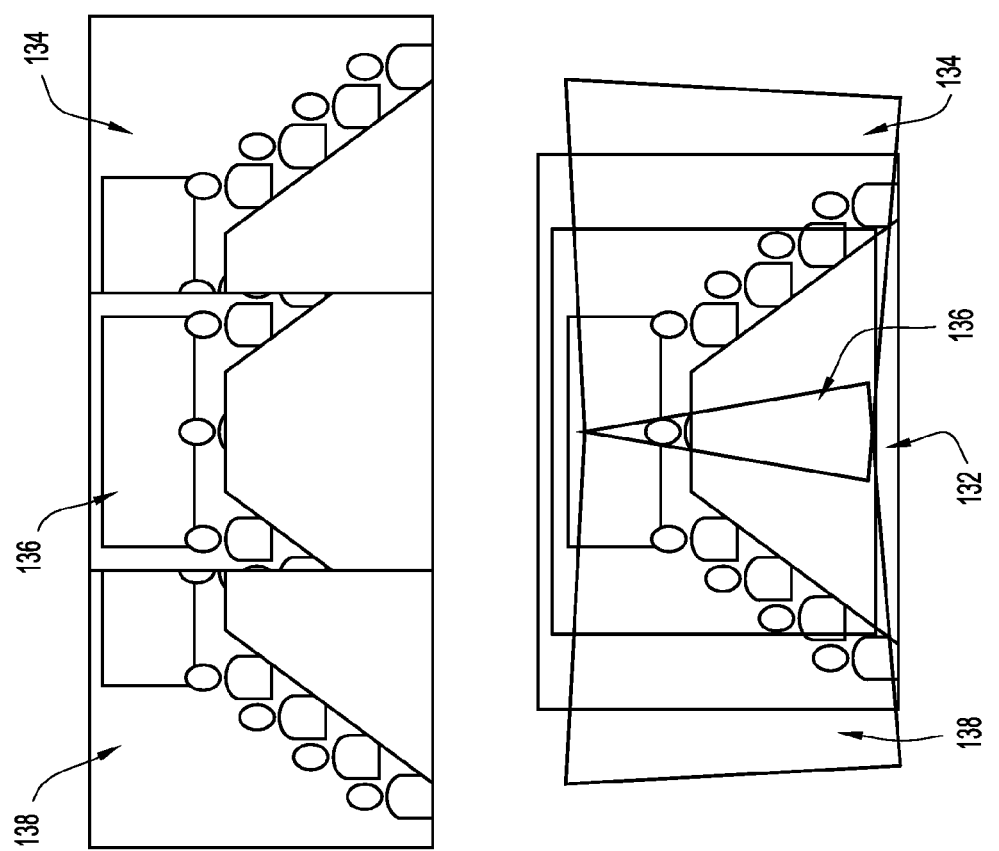

CAMERA SYSTEM FOR VIDEO CONFERENCE ENDPOINTS

TECHNICAL FIELD

The present disclosure relates to video conference systems.

BACKGROUND

Video conference systems, sometimes referred to as videoconference, teleconference, telepresence, or collaboration systems, allow meetings between persons or groups of people at different locations. Video conference systems may include equipment configured to provide both video and audio communication between the different locations.

For example, certain video conference systems include endpoints that are equipped with multiple cameras and multiple displays configured to capture and present, respectively, different video streams. The video streams can be classified as participant streams (i.e., video captured by cameras and containing views of meeting participants) or data content streams (i.e., computer generated graphical content presented by meeting participants). Some endpoints may also track various participants, such as talking participants, and follow the tracked participants by manipulating the camera system mechanically.

BRIEF DESCRIPTION OF THE DRAWINGS

FIG. 3A illustrates a side view of the camera system of FIGS. 1 and 2 installed above a video conference endpoint display, according to an example embodiment.

FIGS. 3B and 3C illustrate side perspective views of the camera system of FIG. 3A, according to example embodiments.

FIG. 4A illustrates a side view of the camera system of FIGS. 1 and 2 installed below a video conference endpoint display, according to an example embodiment.

FIGS. 4B and 4C illustrate side perspective views of the camera system of FIG. 4A, according to example embodiments.

FIG. 5 illustrates examples of fields of view provided by cameras included in the camera system for video conference systems of FIGS. 1 and 2, according to an example embodiment.

Like reference numerals have been used to identify like elements throughout this disclosure.

DESCRIPTION OF EXAMPLE EMBODIMENTS

Overview

Figure 1:
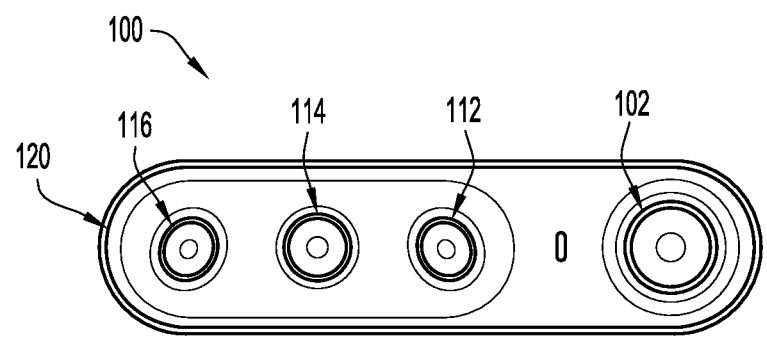
FIG. 1 is a front perspective view of a camera housing of a camera system for video conference endpoint, according to an example embodiment.

Presented herein are a camera system for video conference endpoints and techniques for utilizing the camera system.

According to at least one example embodiment, a camera system includes a fixed wide lens camera, a first fixed camera, a second fixed camera, a third fixed camera, and a processor. The wide lens camera is configured to provide a view of a space and to output a first video signal. The first fixed camera is configured to provide a view of a first portion of the space and to output a second video signal. The second fixed camera is configured to provide a view of a second portion of the space and to output a third video signal. The third fixed camera is configured to provide a view of a third portion of the space and to output a fourth video signal. The processor is operatively coupled to the wide lens camera, the first fixed camera, the second fixed camera, and the third fixed camera, and is configured to receive the first video signal, the second video signal, the third video signal, and the fourth video signal. The processor is also configured to select a relevant video signal from the first video signal, the second video signal, the third video signal, and the fourth video signal, process the relevant video signal by digitally panning, tilting, and zooming the relevant video signal to produce a processed video signal, and output a video stream from the processed video signal.

Example Embodiments

The camera system presented herein includes a wide lens camera and three long focus lens cameras, such as telephoto lens cameras. These four cameras collectively serve as a single camera for a video conference system and the perspective views provided by the four cameras allow the camera subsystem to provide coverage for a variety of video conference settings with high quality images over the camera system's full working range. In order to provide different perspective views (i.e., zooms) of video conference settings, the views provided by the four cameras can be digitally processed using digital pan-tilt-zoom (PTZ) techniques. All four cameras (the wide lens camera and the three long focus lens cameras) are fixed and stationary once installed, but the arrangement and orientation of the cameras, as well as the processing associated with the cameras, allow the camera system to provide fast and flexible speaker or object tracking for video conference systems in a variety of settings. Fixing the cameras avoids intrusive camera movements at the video conference endpoint and reduces the mechanical wear and tear and cost of the camera components compared to mechanical PTZ camera solutions. Fixing the cameras also reduces the cost of maintenance compared to mechanical PTZ camera solutions.

In order to describe the camera presented herein, terms such as "left," "right," "top," "bottom," "front," "rear,"

"side," "height," "length," "width," "upper," "lower," "interior," "exterior," "inner," "outer," "depth," and the like as may be used. However, it is to be understood that these terms merely describe points of reference and do not limit the present invention to any particular orientation or configuration. For example, the terms "right" and "left" may be used to describe certain embodiments presented herein, but it is to be understood that these terms are not intended to limit the camera system presented herein to a single orientation. Instead, the camera system presented herein, or portions thereof, may be oriented in any a number of orientations. Thus, even if a certain feature is described herein as being oriented on the "right," it may be understood that this feature may be oriented on the "left" when the camera system is manually adjusted into a different orientation.

Reference is first made to FIG. 1, which shows a portion of an example embodiment of a camera system 100, according to the present invention. The camera system 100, which may be alternatively referred to as camera assembly 100, camera subsystem 100, or simply as camera 100, includes a wide angle lens camera 102, a first long focus lens camera 112, a second long focus lens camera 114, and a third long focus lens camera 116. The wide angle lens camera 102, the first long focus lens camera 112, the second long focus lens camera 114, and the third long focus lens camera 116 are each fixed in the camera system 100, such that the camera system 100 does not move (i.e., rotate in any manner) and each of these cameras is positioned to provide different perspective views of a video conference space, such as a meeting room or collaboration room. As is discussed in detail below, the first long focus lens camera 112, the second long focus lens camera 114, and the third long focus lens camera 116 provide views of portions of the view provided by the wide lens camera 102 while also extending the view of the wide angle lens camera 102 horizontally (i.e., in the X-direction).

The combination of views from the wide angle lens camera 102, the first long focus lens camera 112, the second long focus lens camera 114, and the third long focus lens camera 116 allow the camera system 100 to digitally PTZ within video signals provided by these cameras in order to provide views from different zoom perspectives of various portions or areas of a space. For example, the video signal from the wide angle lens camera 102 may have a field of view (FOV) of approximately 83 degrees, but this FOV may reduced to approximately 27.7 degrees (i.e., 3× zoom) when the video signal is processed with digital PTZ. By comparison, the video signals from the long focus lens cameras 112, 114, 116 may each have a field of view (FOV) of approximately 50 degrees and these video signals may be manipulated with digital PTZ to provide views with a FOV of approximately 17.7 degrees (i.e., 3× zoom).

Figure 2:
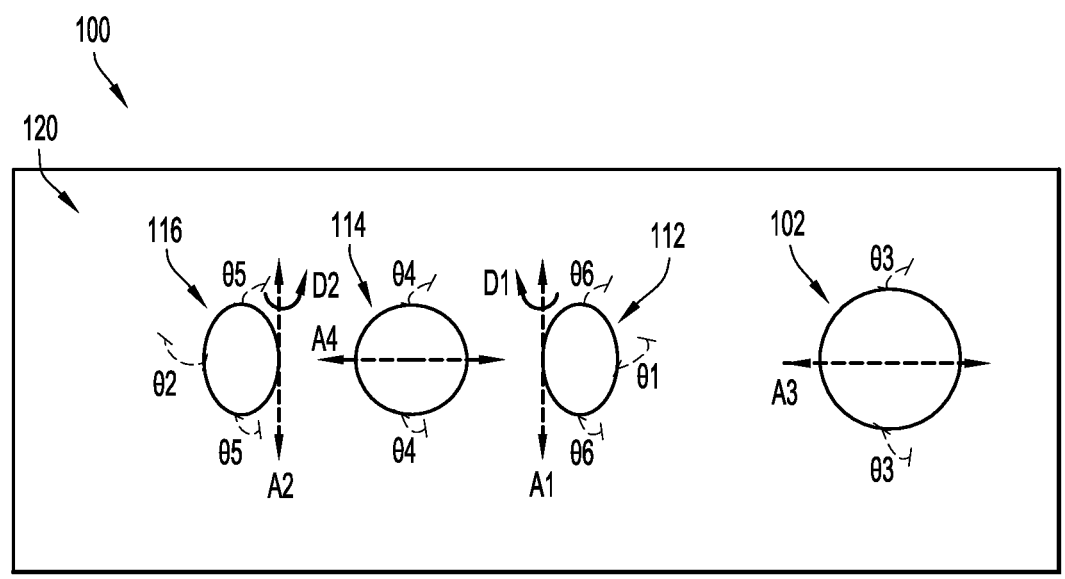
FIG. 2 is a diagram illustrating the angular positions of the individual cameras of the camera system, according to an example embodiment.

Now referring to FIG. 2, the wide angle lens camera 102, the first long focus lens camera 112, the second long focus lens camera 114, and the third long focus lens camera 116 are fixedly positioned within a camera housing 120 in specific orientations in order to position the FOVs of the cameras included in camera system 100 to cover relevant portions of a variety of video conference room scenarios. The wide lens camera 102, the first long focus lens camera 112, the second long focus lens camera 114, and the third long focus lens camera 116 are fixed close together and horizontally aligned. Additionally, the wide lens camera 102 and the second long focus lens camera 114, which may also be referred to as the central long focus lens camera 114, are each positioned to provide a substantially straight view. Meanwhile, the first (i.e. right) long focus lens camera 112 and the third (i.e., left) long focus lens camera 116 are rotated outwards from the camera housing 120 (i.e., towards each other) so that the FOV of the first long focus lens camera 112 and the FOV of the third long focus lens camera 116 at least partially overlap.

More specifically, the first long focus lens camera 112 is rotated a first angle $\theta 1$ about a vertical axis A1 in a first direction D1 and the third long focus lens camera 116 is rotated a second angle $\theta 2$ about a vertical axis A2 in a second direction D2 that is opposite the first direction D1. The first axis A1 is on an inner edge of the first long focus lens camera 112 and the second axis A2 is on an inner edge of the third long focus lens camera 116, such that the first long focus lens camera 112 and third long focus lens camera 116 provide crossing angled views. In some embodiments, the first angle $\theta 1$ and the second angle $\theta 2$ are the same and measure approximately 22.5 degrees, which may allow the first long focus lens camera 112 and second long focus lens camera 116 to cover the width of a wide variety of rooms. However, in other embodiments, the first angle $\theta 1$ and the second angle $\theta 2$ may be any angles, such as angles within a range of approximately 20 degrees to approximately 25 degree. The first angle $\theta 1$ and the second angle $\theta 2$ may also be different angles. Additionally or alternatively, angles $\theta 1$ and $\theta 2$ may be negative angles, such that the first long focus lens camera 112 and second long focus lens camera 116 are rotated inwards relative to the camera housing 120 (i.e. away from each other) and provide side views that do not cross.

Referring now to FIGS. 3A, 3B, 3C, 4A, 4B, and 4C with continued reference to FIG. 2, each of the wide angle lens camera 102, the first long focus lens camera 112, the second long focus lens camera 114, and the third long focus lens camera 116 may also be positioned within the camera housing 120 in specific orientations with respect to a horizontal plane (i.e., the XY-plane). Depending on the position of the camera system 100 relative to the endpoint 150, the camera system 100, or portions thereof, can be tilted with respect to the XY-plane (and the endpoint 150) to provide a FOV that will cover standing and sitting participants in a video conference scenario. More specifically, depending on whether the camera system 100 is positioned above an endpoint display 152, as shown in FIGS. 3A, 3B, and 3C, or below an endpoint display 152, as shown in FIGS. 4A, 4B, and 4C, the wide lens 102 is tilted about a horizontal axis A3 at an angle $\theta 3$, either upwards (positive angles) or downwards (negative angles) with respect to the camera housing 120. The angle $\Theta 3$ may also depend on the height of the installation of the camera 100, which may depend on the size of a video conference endpoint.

In some embodiments, $\theta 3$ is in the range approximately −25 degrees to approximately +10 degrees with respect to the camera housing 120. In these embodiments, the center long focus lens camera 114 is tilted about its horizontal axis A4 to an angle $\theta 4$ that may be in the range of approximately −10 to approximately +10 degrees relative to the wide lens camera 102 (i.e., in the range of approximately −35 degrees to +20 degrees with respect to the camera housing 120). Angling the center long focus lens camera 114 in this manner may allow the center long focus lens 114 to cover sitting and standing participants close to the system 100, as well as whiteboards included along a rear wall of a video conference room.

Moreover, in some embodiments, the side long focus lenses 112, 116 may also be tilted about the horizontal axis A4, to angles $\theta 5$ and $\theta 6$, respectively, each of which may be in the range of approximately −10 degrees to approximately +10 degrees relative to the wide lens camera 102 (i.e., in the range of approximately −35 degrees to +20 degrees with respect to the camera housing 120), with negative angles still indicating downward adjustments and positive angles still indicating upward adjustments. However, in order to ensure the camera system 100 can provide smooth transitions between the various views, the side long focus lenses 112, 116 are preferably vertically aligned and, thus, angles θ5 and θ6 may be the same, such as approximately +2 degrees relative to the wide angle lens camera 102. Moreover, since the left long focus lens camera 116 and the right long focus lens camera 112 are placed at an angle relative to the global tilt axis of camera system 100 (i.e., the tilt with respect to the XY-plane), the left long focus lens camera 116 and the right long focus lens camera 112 will roll (i.e. rotate about their Y-axis) when the camera housing 120 is titled. This roll may be digitally adjusted based on feedback from tilt sensors included in the camera 100. For example, in some embodiments, an accelerometer is used to measure the tilt angle of the overall system 100, and the measured tilt angle is used as input to calculate the needed digital roll of the left and right long focus lenses properly align the views provided by the side cameras 112 and 116.

FIGS. 3A, 3B, 3C, 4A, 4B, and 4C show example embodiments of an endpoint 150 including a display 152 and a camera system 100 with an endpoint housing 130 that substantially spans the width of the endpoint 150 are shown. In FIGS. 3A, 3B, and 3C, the camera system 100 is positioned above the video conference endpoint display 152. Meanwhile, in FIGS. 4A, 4B, and 4C, the camera system 100 is positioned beneath the video conference endpoint display 152. In both of these embodiments, the endpoint housing 130 or a portion thereof (i.e., camera housing 120) may be tilted with respect to the XY-plane in order to angle the camera system 100 downwards (negative angles) or upwards (positive angles). Moreover, in both of these embodiments, the wide angle lens camera 102 and long focus lens cameras 112, 114, 116 may also be tilted within the camera system 100 with respect to the camera housing 120 and/or endpoint housing 130.

Now referring to FIGS. 3A, 3B, and 3C, the camera system 100 may be tilted to a tilt angle θ7 when positioned above the endpoint display 152. The tilt angle θ7 may be between approximately 0 degrees and approximately −25 degrees with respect to the XY-plane. Consequently, the camera system 100 may be substantially flat with respect to the endpoint display 152 (and the XY-plane), as shown in FIG. 3B, or tilted downwards with respect the endpoint display 152 (and the XY-plane), as shown in FIG. 3C. The wide angle lens camera 102 and long focus lens cameras 112, 114, 116 may be positioned (i.e., installed or manually adjusted) within the camera housing 120 based on the expected orientation (i.e., expected tilt angle θ7) of the camera system 100 with respect to the endpoint display 152.

More specifically, if the camera system 100 is to be mounted above the display 152 in a substantially flat position (i.e., angle θ7 is approximately 0), as shown in FIG. 3A, the wide angle lens camera 102 may be titled downwards to an angle θ3 between approximately −15 degrees and approximately −25 degrees with respect to the camera housing 120. By comparison, if the camera system 100 is mounted above the display 152 at an angle θ7 between approximately −15 degrees and approximately −25 degrees with respect to the XY-plane, the wide angle lens camera 102 is tilted downwards to an angle θ3 that orients the wide angle lens camera 102 at a collective or overall tilt angle (i.e., θ3+θ7) between approximately −15 degrees and approximately −25 degrees with respect to the XY-plane.

For example, in some embodiments, the camera system is positioned at an angle θ7 of approximately −12 degrees with respect to the XY-plane and the wide angle lens camera 102 is positioned at an angle θ3 of approximately −5 degrees with respect to the camera housing 120.

Still referring to FIGS. 3A, 3B, and 3C, the overall tilt angle (i.e., θ3+θ7) of the camera system 100 depends on the height of the installation of the camera system 100. For example, in some embodiments, the overall tilt angle (i.e., θ3+θ7) is approximately −15 degrees when the camera system 100 is mounted 150 cm above the floor, approximately −17 degrees when the camera system 100 is mounted 190 cm above the floor, and varies linearly therebetween. Moreover, when the camera system 100 is positioned above the endpoint display, at least some of the long focus lens cameras 112, 114, and 116 are tilted upwards relative to the wide angle lens camera 102 to an angle θ4 between approximately 4 degrees and approximately 7 degrees, such as approximately 6 degrees. Tilt angles in this range may ensure that the long focus lens cameras 112, 114, and 116 can cover whiteboards and standing meeting participants in a video conference room.

Now turning to FIGS. 4A, 4B, and 4C, when the camera system 100 is positioned below a display 152 of the endpoint 150, the housing 120 of the camera system 100 may be oriented at a tilt angle θ8 with respect to the endpoint display 152. The tilt angle θ8 may be between approximately 0 degrees and approximately +15 degrees with respect to the XY-plane so that the camera system 100 may be positioned to be substantially flat with respect to the endpoint display 152 (and the XY-plane), as shown in FIG. 4B, or tilted upwards with respect the endpoint display 152 (and the XY-plane), as shown in FIGS. 4A and 4C. Additionally, as mentioned, the wide angle lens camera 102 and long focus lens cameras 112, 114, 116 may be tilted within the camera housing 120 based on the expected orientation of the camera system 100 with respect to the endpoint display 152 to provide a range of overall tilt angles (i.e., θ3+θ8), similar to the embodiment shown in FIGS. 3A, 3B, and 3C.

For example, in some embodiments, the wide angle lens camera 102 may be tilted downwards to an angle θ3 of approximately −5 degrees with respect to the camera housing 120 when the camera system 100 is mounted below the display 152 in a substantially flat position (i.e., angle θ8 is approximately 0), as shown in FIG. 4A. Alternatively, if the camera system 100 is mounted below the display 152 at an angle θ8 of approximately +10 degrees with respect to the XY-plane, the wide angle lens camera 102 may be tilted downwards to an angle θ3 of approximately −15 degrees with respect to the camera housing 120 to orient the wide angle lens camera 102 at a collective or overall tilt angle (i.e., θ3+θ8) of approximately −5 degrees. However, in other embodiments, the wide angle lens camera 102 may be tilted upwards or downwards to any angle θ3 with respect to the camera housing 120 to provide an overall tilt angle (i.e., θ3+θ8) of between approximately +10 degrees and approximately −25 when the camera system 100 is mounted below the display 152.

Still referring to FIGS. 4A, 4B, and 4C, the tilt angle θ8 and the overall tilt angle (i.e., θ3+θ8) of the camera system 100 may depend on the height of the installation of the camera system 100. For example, if the camera system 100 is disposed beneath a 86" endpoint display 152, the camera system 100 may positioned 110 cm above the floor and angle θ8 may be approximately 12 degrees. Additionally or alternatively, the long focus lens cameras 112, 114, 116 may be tilted with respect to the housing 120 in the same manner as discussed above with regards to FIGS. 3A, 3B, and 3C.

Now referring to FIG. 5, example fields of view (FOVs) provided by the wide angle lens 102, the first long focus lens 112, the second long focus lens 114, and the third long focus lens 116 are shown, according to an example embodiment. The wide angle lens 102 provides an overall FOV 132 of a space, while the first long focus lens 112 provides a FOV 134, the second long focus lens 114 provides a FOV 136, and the third long focus lens 116 provides a FOV 138 that are each focused on a portion of the space about half the size of the FOV 132 (i.e. 2× zoom) provided by the wide angle lens 102. More specifically, in some embodiments, the FOV 132 of the wide angle lens camera 102 is approximately 83 degrees and the FOV 134 provided by the first long focus lens camera 112, the FOV 136 provided by the second long focus lens camera 114, and the FOV 138 provided by the third long focus lens camera 116 are each approximately 50 degrees, albeit of different portions of the space.

This combination of views shown in FIG. 5 provides an optimal compromise between zoom range and flexibility, such that the camera system 100 has enough flexibility to provide a wide range of zoom options (by digitally zooming within the different perspectives provided by the wide lens camera 102 and long focus lens cameras 112, 114, and 116) without the need to mechanically move the camera system. Moreover, the aforementioned FOVs may ensure the camera system 100 can capture enough of a meeting scenario while minimizing distortion associated with providing a wide FOV. However, in other embodiments, the wide angle lens 102 may have a FOV 132 in the range of approximately 70 degrees to approximately 120 degrees and the first long focus lens camera 112, the second long focus lens camera 114, and the third long focus lens camera 116 may have FOVs 134, 136, and 138, respectively, in the range of approximately 30 degrees to approximately 60 degrees, provided that the FOVs are approximately 1.5×-3× zoomed relative to the wide lens 102.

Still referring to FIG. 5, in order to provide sufficient overlap of the FOVs of the long focus lenses and gain a wide enough working range, the three long focus lens cameras 112, 114, and 116 are arranged to provide FOVs 134, 136, 138, respectively, that intersect each other at approximately ½ of their FOVs. In other words, the FOVs 134, 136, 138 have a pan angle therebetween that is relative to the telephoto lens FOVs and approximately ½ of each FOV. As mentioned, the side long focus lens cameras 112, 116 may also be tilted vertically to cover both sitting and standing participants close to the system in the left and right part of the room; however, the vertical tilting of the telephoto lens cameras 112, 116 is limited by the FOV 132 of the wide lens 102. By comparison, the horizontal panning provided by FOV 134 and FOV 138 need not be limited by the FOV 132 of the wide angle lens 102. In most embodiments, the camera system 100 does not need to provide a view that extends above or below the wide angle lens FOV 132 because the wide angle lens FOV 132 is configured to provide sufficient space above and below persons or objects in the space that might need to be framed. By comparison, the horizontal component of the FOV 132 provided by the wide angle lens 102 may not provide sufficient space to the right and left of participants included at the edge of this FOV 132. Thus, the FOVs 134, 138 provided by side long focus lens cameras 112, 116 may extend horizontally beyond the FOV 132 provided by the wide angle lens camera 102 to allow participants adjacent the edges of the wide lens 102 FOV 132 to be properly framed when a close-up shot of these participants is provided (i.e., when a digital zoom of the FOV 134 or FOV 138 it taken to show a close-up of a speaking participant in one of these areas).

Collectively, the FOV 132 provided by the wide lens 102 and the FOVs 134, 136, and 138 provided by the long focus lens cameras 112, 114, and 116, respectively, may provide coverage for a wide variety of video conference scenarios. For example, camera system 100 may configured to provide coverage for briefing room scenarios including rooms with stadium seating or tables configured for pairs of participants, small meeting/collaboration rooms including square tables, round tables, trapezoid tables, etc. and approximately 4-7 chairs, medium meeting rooms including square tables, round tables, trapezoid tables, etc. and, 10-12 chairs, and large meeting room including horse shoe setups and approximately 18-20 chairs. Additionally, camera system 100 may also be configured to provide coverage for executive offices, small immersive rooms, or any other video conferencing scenario.

Figure 6:
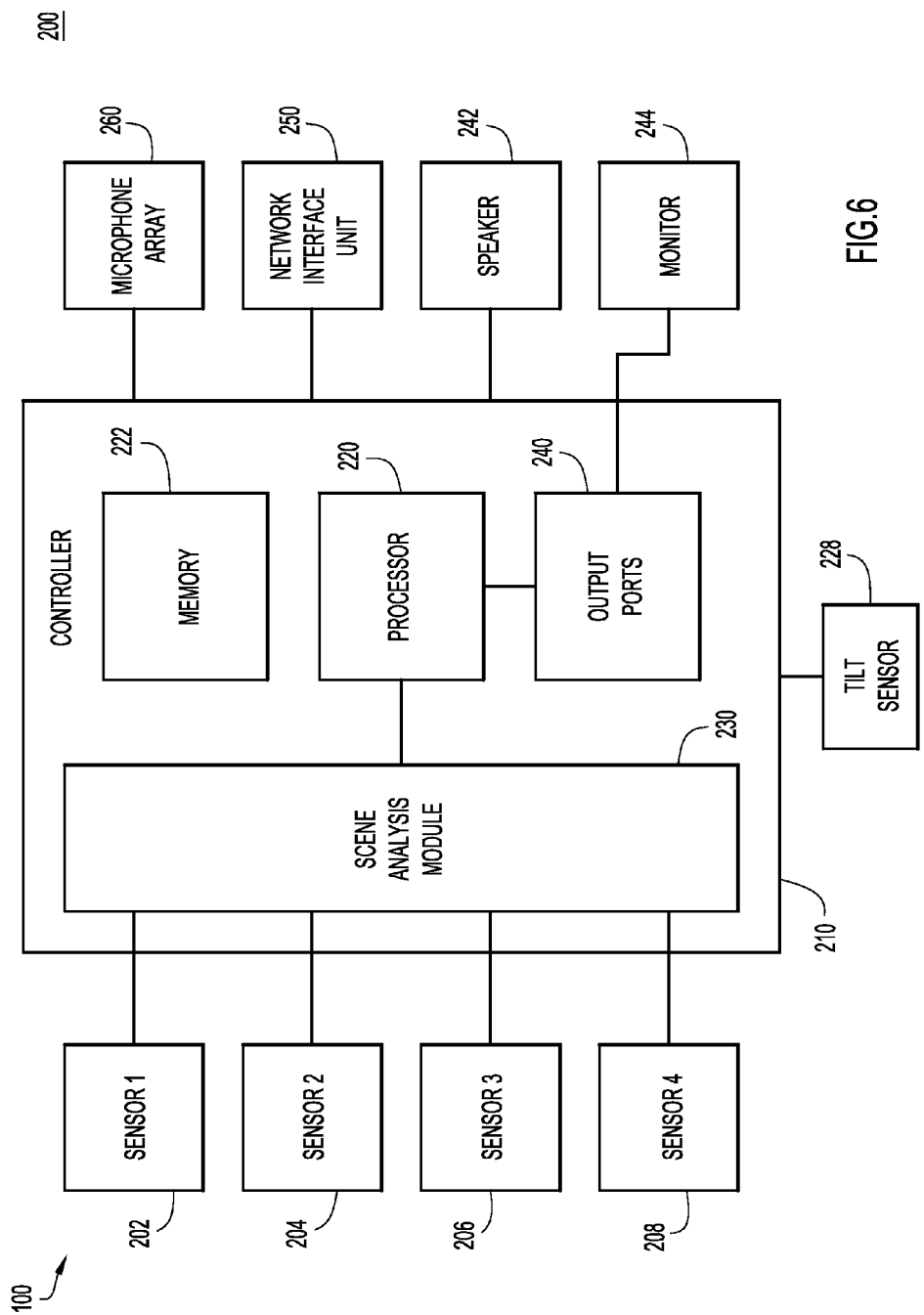
FIG. 6 is a block diagram of the camera system of FIGS. 1 and 2, according to an example embodiment.

Now referring to FIG. 6, a block diagram 200 of an example embodiment of camera system 100 according to the present invention is shown. The camera system 100 includes four camera image sensors: sensor 1 202, sensor 2 204, sensor 3 206, and sensor 4 208, respectively corresponding to the wide lens camera 102 and long focus lens cameras 112, 114, and 116 discussed above, that are operatively coupled to a controller 210. The controller 210 includes a processor 220, a scene analysis module 230, and various output ports 240. In one example, the functions of the processor 220 and the scene analysis module 230 may be implemented by fixed or programmable digital logic gates (e.g., in a programmable gate array). Alternatively, the functions of the controller 210 are implemented by software stored in a memory 222 that, when executed, causes the processor 220 to perform the operations described herein for the controller 210. The controller 210 is operatively coupled to a speaker 242, a monitor 244, a network interface unit 250 that enables network communication, and a microphone array 260 that may be configured to detect audio in the space being monitored by camera image sensors 202, 204, 206, and 208. Additionally, the controller 210 is operatively coupled to a tilt sensor 228, such as an accelerometer, that can measure the tilt angle of the overall system 100, and allow the controller 210 to digitally roll the left and right long focus lenses to properly align the views provided by the side cameras 112 and 116, as described above.

Generally, memory 222 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 222 is or includes one or more tangible (non-transitory) computer readable storage media (e.g., a memory device) encoded with software comprising computer executable instructions. For example, memory 222 may store instructions that may be executed by processor 220 for performing tasks associated with determining a relevant video signal and generating a video stream, as described herein.

Figure 7:
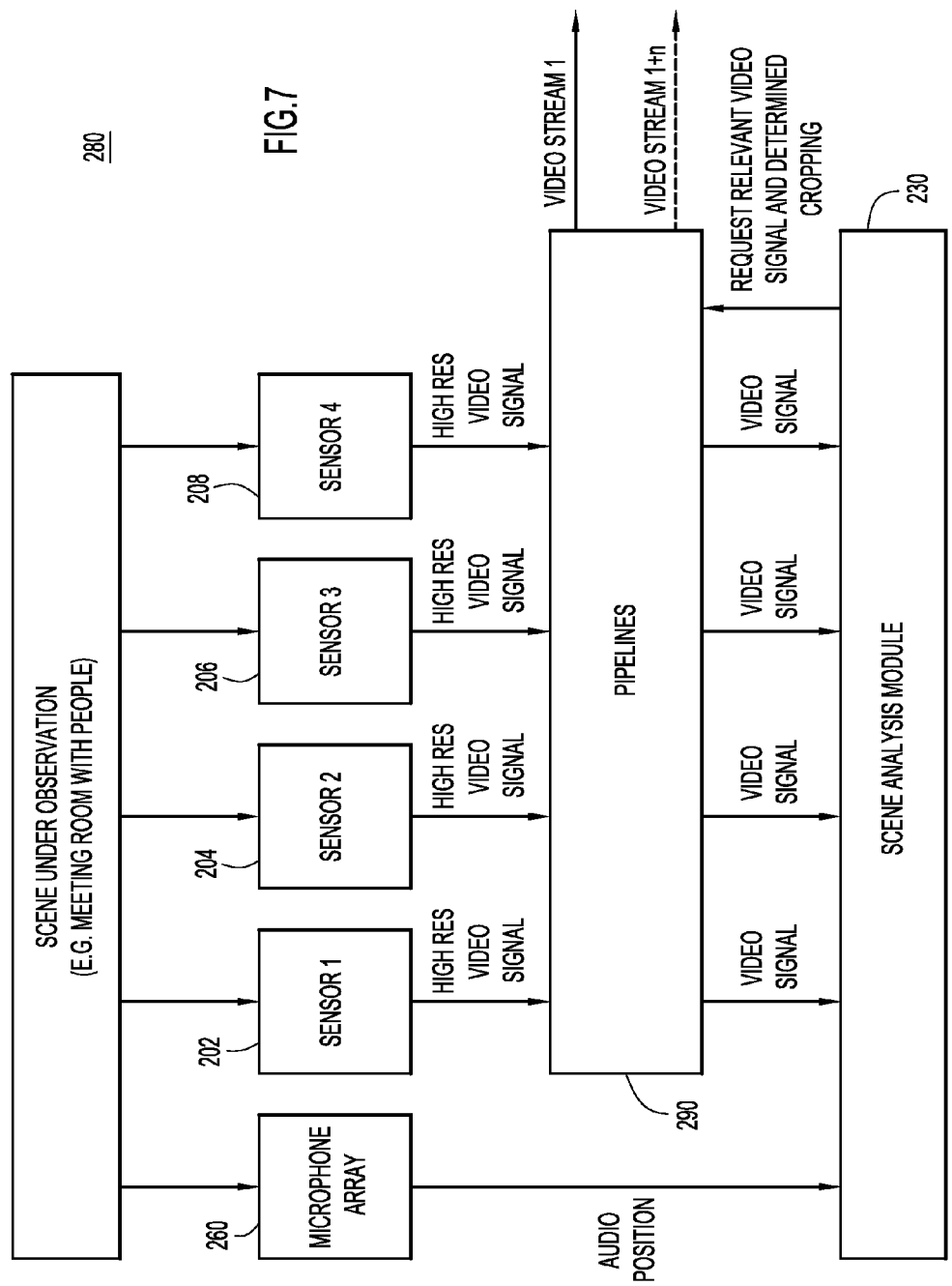
FIG. 7 is a data flow diagram depicting operations performed by the elements of the block diagram of FIG. 6, according to an example embodiment.

Now referring to FIG. 7, but with continued reference FIG. 6 a sequence diagram 280 illustrating the paths of data (e.g., video signals) produced by image sensors 202, 204, 206, and 208 is now described. In some embodiments, the controller 210 may include processing pipelines 290 configured to receive high resolution video signals from each of the sensors 202, 204, 206, and 208 and convert these signals into a video stream to be output to another video conferencing endpoint. The pipelines 290 may also include croppers and scalers that can digitally process (i.e., with digital PTZ) the video signals provided by the camera image sensors 202, 204, 206, 208. As shown, the pipelines 290 initially convert the high resolution video signals into video signals and forward the video signals to the scene analysis module 230. The scene analysis module 230, based on instructions from the processor 220, performs image analysis to detect where in the scene people are sitting, determine whether or not there is a current speaker, determine the location of a speaker, and whether there are other objects of interest in the scene. Based on at least these determinations, an area of interest in the space being monitored can be determined and at least one of the four video signals received from the sensors 202, 204, 206, 208 is determined to be a relevant video signal if it provides a view of the area of interest.

The scene analysis module 230 may also determine the appropriate crop (i.e. the digital PTZ that should be applied) for the relevant video signal based on detected objects, detected participants, and/or the determined area of interest. Then, the relevant video signal and cropping may be requested from the pipelines 290 and, once received, the processed video signal may be output, via the pipelines 290 as a video stream. In some embodiments, although several video signals may cover a relevant area (i.e., an area of interest), one video signal is chosen at a time based on which signal best covers the area of interest. However, in other embodiments, multiple signals may be determined to be relevant and a crop may be selected for each relevant signal to be output. In embodiments that select multiple video signals, the video signals are not combined. Instead, an appropriate cropping is selected for each relevant video signal and the individual video signals are output together as two separate streams, as is described in detail below. Regardless of the number of streams, in most embodiments, Session Initiation Protocol (SIP) may be used both for call setup and handling, and for signaling capabilities of the different sites. Video streams may be sent in any manner, however, in most embodiments, only used video streams are sent between sites.

Figure 8:
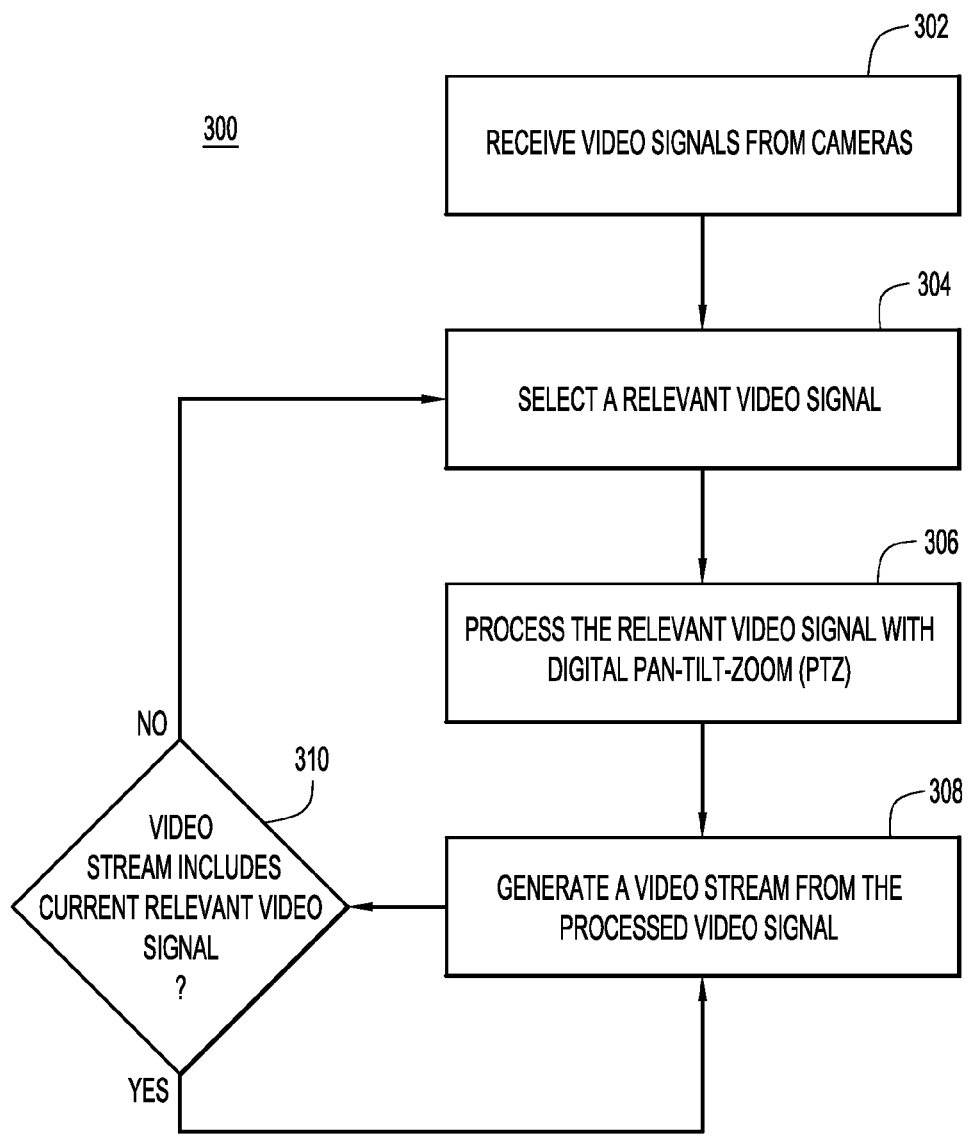
FIG. 8 is a high-level flowchart depicting operations performed by the camera system, according to an example embodiment.

Now referring to FIG. 8, a high-level flow chart 300 depicting operations performed by the processor 220, or at least based on instructions from the processor 220, is now described, according to an example embodiment. Reference is also made to FIGS. 6 and 7 for purposes of the description of FIG. 8. Initially, at step 302, the processor 220 receives video signals from any of the cameras included in the camera system 100. These signals are analyzed in order to select a relevant video signal at step 304. In some embodiments, a relevant video signal will be selected based on where in the viewed space or area of interest audio is detected, perhaps to provide speaker tracking. In other embodiments, a video signal may be selected as a relevant video signal if an object of interest, such as a whiteboard, is detected in the video signal. Once the relevant video signal is selected, the relevant video signal is processed with digital PTZ processing at step 306 in order to provide the best crop (i.e., zoom) of the video signal. As is described below, in some embodiments, the best crop may be a portrait of a participant, a headshot of a participant, or an overview of the video conference room. At step 308, a video stream is generated based on the processed video signal. In some embodiments, the video stream may continually update to include the most relevant video signal at that time, perhaps to provide speaker tracking in a room with a large number of participants. Accordingly, at step 310, a determination as to whether the video stream includes the current relevant video signal may be made. If the video stream does not include the current relevant signal, a new relevant signal may be determined at step 304 and the new relevant signal may be processed to provide a crop and generate a video stream at steps 306 and 308. Alternatively, if the video stream includes the current relevant video signal, the video stream may continue to be generated based on the processed video signal that was previously determined to be relevant.

Figure 9:
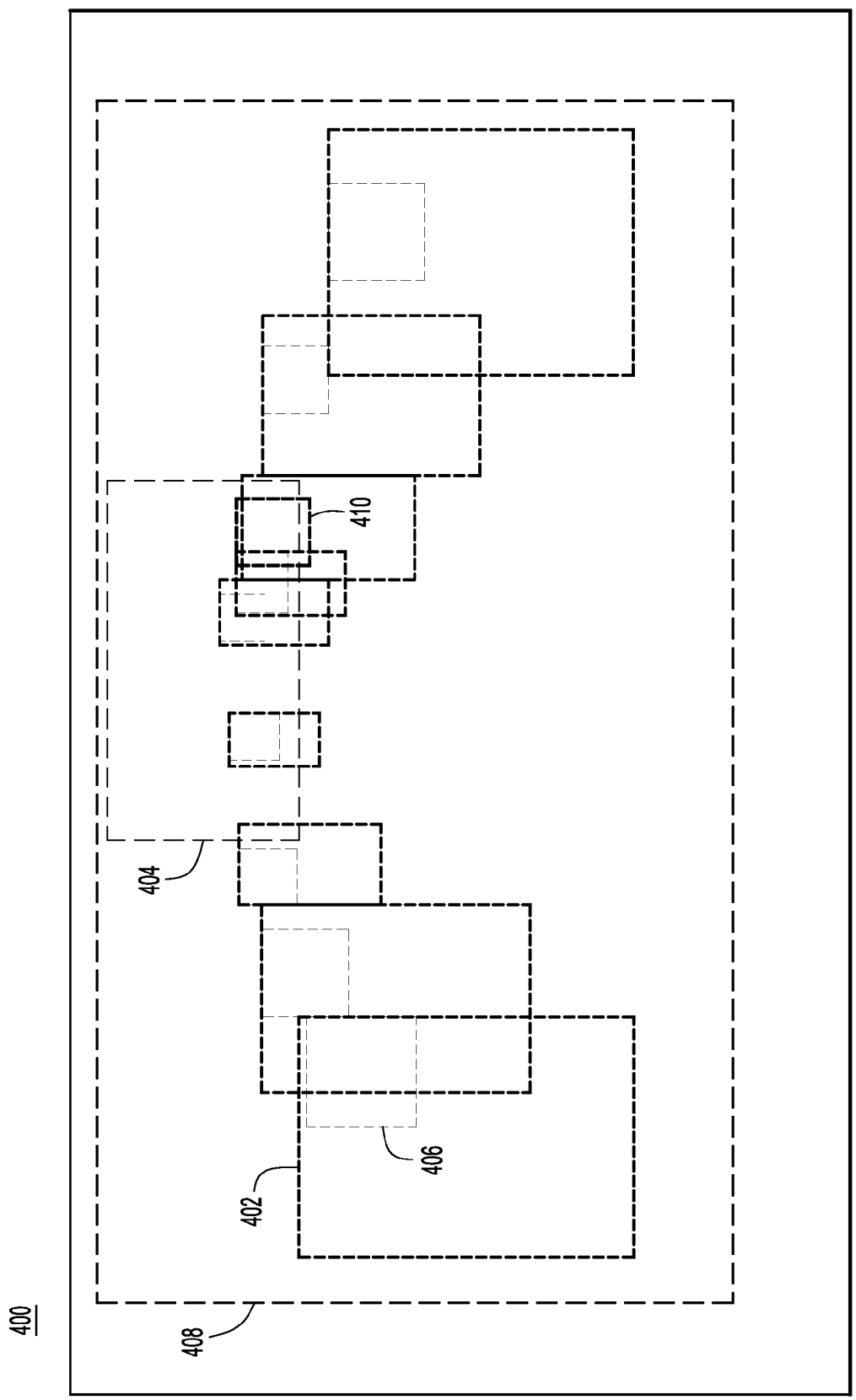
FIG. 9 illustrates outlines of different views that are tracked and determined by the camera system, according to an example embodiment.

Now referring to FIG. 9, an example videoconference space 400 is shown with example tracking markings 402 illustrated therein. As mentioned, in some embodiments, the camera system 100 may detect participants, speakers, and objects within a space. In the depicted embodiment, nine participants are detected at portrait sized tracking boxes 402 and their heads are detected at headshot sized tracking boxes 406. Moreover, a whiteboard is detected at tracking box 404 and an overview including all of the participants and the whiteboard is detected at tracking box 408. Additionally, in some embodiments, a speaker may also be tracked, as indicated by tracking box 410. Accordingly, if it is determined that a certain participant or the whiteboard have become relevant, the video stream may focus thereon (i.e., snap to whiteboard or snap to speaker). In some embodiments, the camera system 100 may continually update each of the aforementioned tracking boxes in order to allow the system to quickly move or snap between different relevant views (i.e., crops of video signals) in a relevant video signal. Moreover, tracking the aforementioned boxes may allow the camera system 100 to quickly process relevant video signals to be compatible for different sized devices when the system is outputting two or more video streams, as is described in detail below. For example, video conference participants receiving the video stream on a laptop or large computing device may receive a view of a speaking participant from a portrait view based on tracking box 402 while participants receiving the stream on a mobile device may only receive a headshot based on tracking box 406.

Figure 10A:
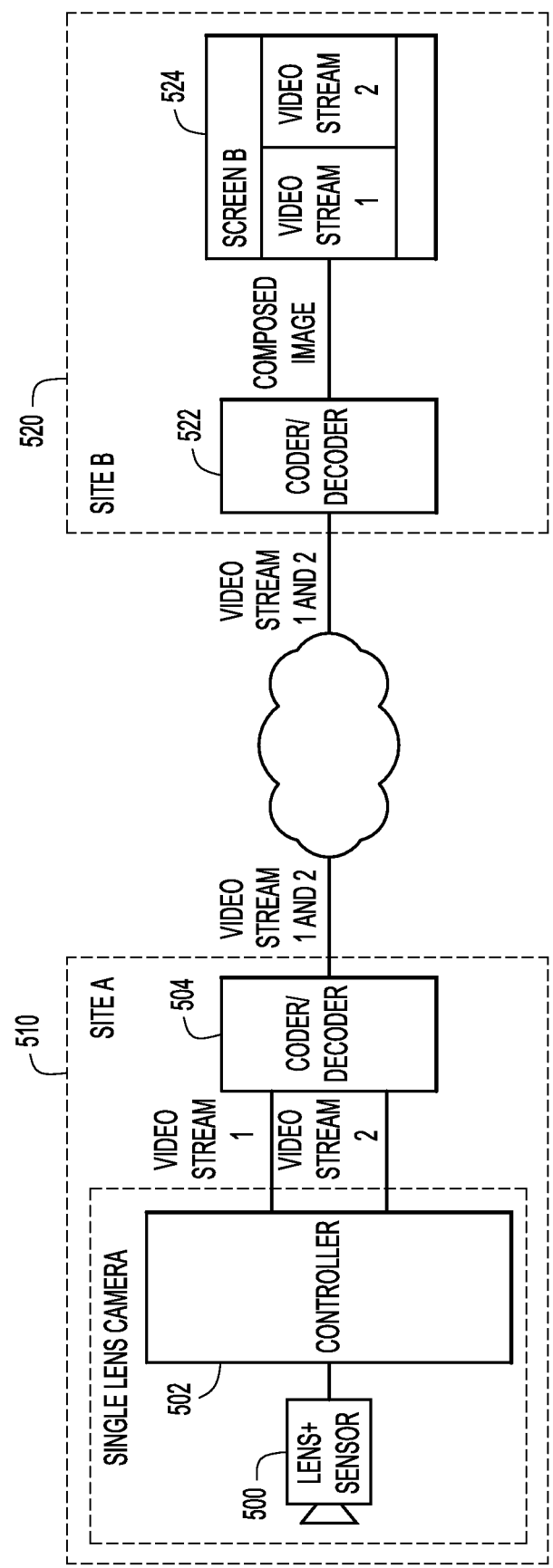
FIGS. 10A, 10B, and 10C are high level block diagrams depicting operations performed by the camera system to provide multiple video streams, according to example embodiments.
Figure 10B:
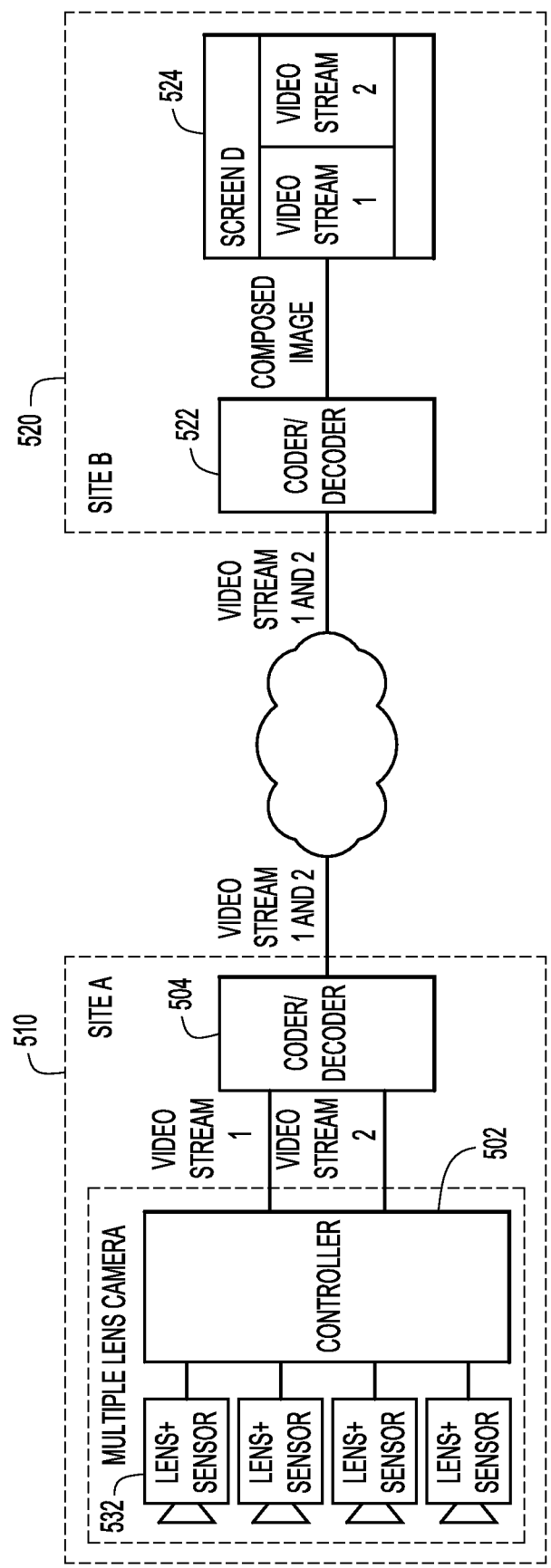
Figure 10C:
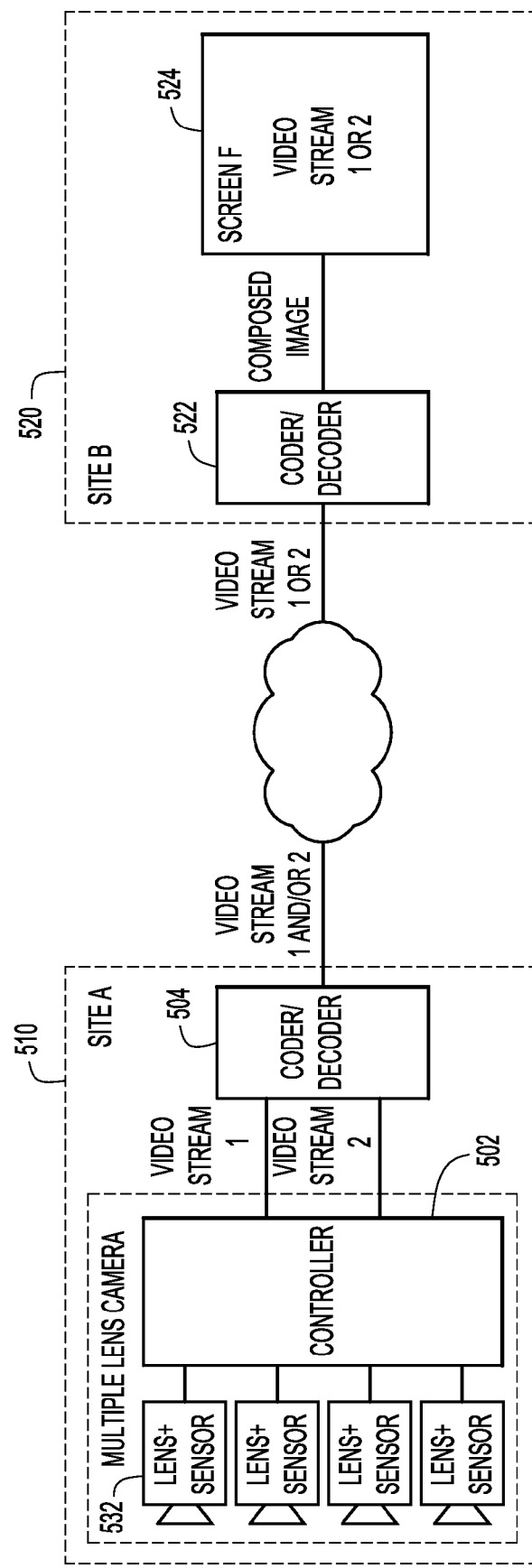

Now referring to FIGS. 10A-10C, block diagrams illustrating example embodiments in which two video streams are output at once (i.e., dual stream) are shown. The video streams may be generated from a video signal generated by a single camera (as shown in FIG. 10A) or from video signals generated by multiple cameras (FIGS. 10B and 10C). Additionally, the video streams may be output to be displayed together (FIGS. 10A and 10B) or as alternatives that can be selected based on user preference, the device the streams are being sent to, and/or any other factors (FIG. 10C). When the two video streams are displayed together, the video streams may be displayed side by side, above each other, in a picture-in-picture arrangement or any other manner. Each of the embodiments shown in FIGS. 10A-10C is addressed in turn below. However, the embodiments depicted in FIGS. 10A-10C are merely examples and in other embodiments, multiple video streams can be generated and displayed in any manner (i.e., a single camera could generate two streams to be displayed as alternatives).

In FIG. 10A, two video streams are generated from a video signal produced by a single camera 500. The video signal generated by camera 500 is processed by a controller 502 that may be similar to the controller described above with respect to FIG. 6. During image processing two different segments of the video signal generated by camera 500 are selected as relevant portions and two crops are selected to capture each of these portions. In order to ensure the two crops have high quality, the single camera 500 has a very high resolution in most single camera embodiments. The streams may be encoded with a coder/decoder 504 (i.e., with a codec) and transmitted from a transmitting endpoint 510 to a receiving endpoint 520. The receiving endpoint 520 may decode the streams with a coder/decoder 522 and display both video streams on a display 524.

In FIGS. 10B and 10C, two video streams are generated from a set of cameras 532 and processed by controller 502. The camera set 532 may be in the form of the camera system 100 described above. During image processing two different video signals, two different portions of one video signal, or two portions of two different video signals generated by the set of cameras 502, are selected as relevant portions and two crops are selected to capture each of these portions. The streams may then be encoded by coder/decoder 504 and transmitted from a transmitting endpoint 510 to a receiving endpoint 520 in the same manner that the video stream is encoded and transmitted in FIG. 10A. Upon receiving the video streams, the receiving endpoint 520 may decode the streams with coder/decoder 522 and either display both video streams on a display 524 (FIG. 10B) or select a stream to be displayed on display 524 (FIG. 10C). In FIG. 10C, the stream that is not being displayed at the receiving endpoint 520 is not sent to the receiving endpoint 520 in order to reduce bandwidth consumption.

Figure 11A:
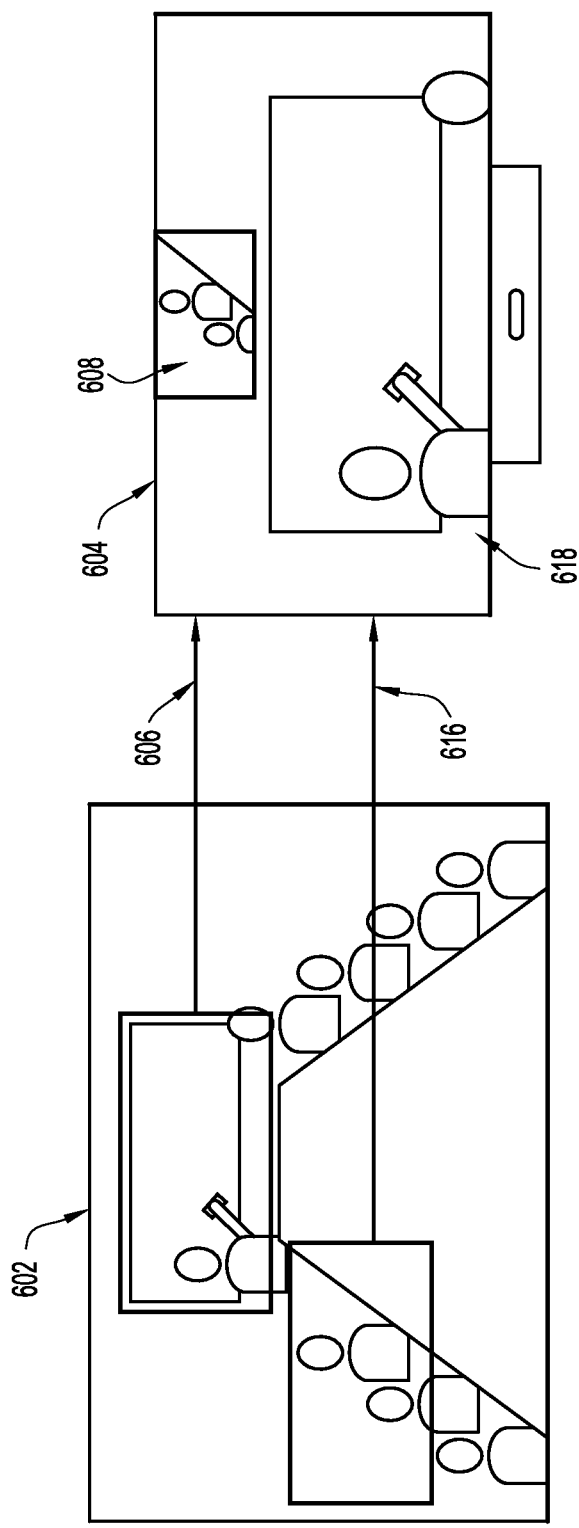
FIGS. 11A, 11B, and 12 illustrate example layouts for displaying multiple video streams of a space on one endpoint display and two endpoint displays, respectively, according to example embodiments.
Figure 11B:
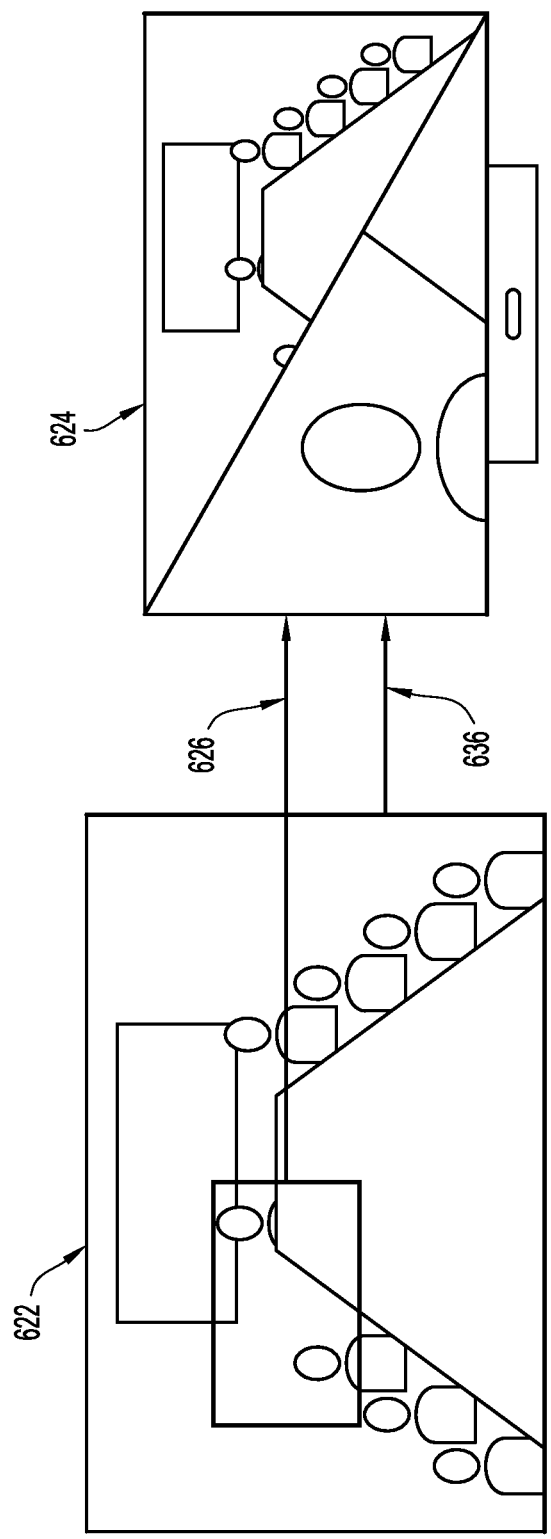
Figure 12:
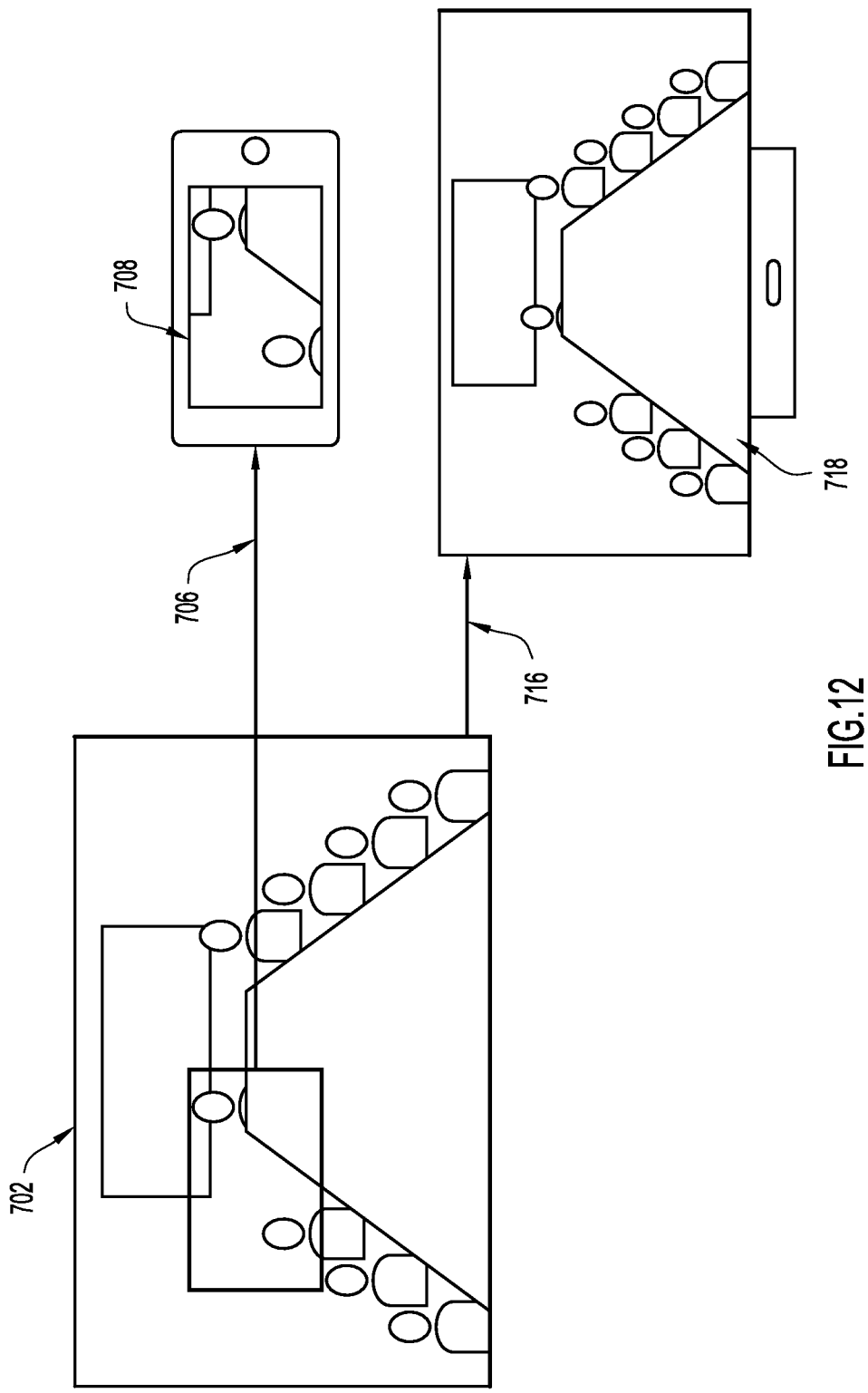

Reference is now made to FIGS. 11A, 11B, and 12. The dual stream transmission scheme shown in FIGS. 10A-10C enables the camera system 100 to provide a variety of features. For example, the camera system 100 can provide a room overview (i.e., based on the tracking depicted in FIG. 9) and a close-up of the current speaker (i.e., based on the tracking shown in FIG. 9) and the receiving endpoint can chose a layout. An example split screen is shown in FIG. 11A, in which a view 602 of teleconference space from a transmitting endpoint is sent to a receiving endpoint with two streams for display as shown at 604 at the receiving endpoint. The first stream 606 provides a speaker tracking view and is shown in a top center portion 608 of the display 604 of the receiving endpoint while the second stream 616 provides a whiteboard view and is shown in the remainder 618 of the display 604 of the receiving endpoint. However, as mentioned, in other embodiments, the content displayed at the receiving endpoint may be divided in any manner in order to provide views of any desirable area of interest, including whiteboard views, speaker tracking views, overviews, etc., in any combination. In some embodiments, the speaker tracking mode may be a default mode, but the users may override this default mode if an overview is desired.

FIG. 11B illustrates another example feature that may be enabled by the dual stream transmission. In FIG. 11B, a view 622 at a transmitting endpoint is transmitted in a first stream 626 that provides an overview and a second stream 636 that provides a speaker tracking view. However, instead of displaying the first stream 626 and 636 at the same time (like in FIG. 11A), the first stream 626 and second stream 636 may be alternately shown over the full area of a display 624 at the receiving endpoint and toggled between. In some embodiments, the camera system 100 may automatically toggle between the first stream 626 and the second stream 636, perhaps depending on how many participants at the transmitting endpoint are speaking; however, in other embodiments a participant at the receiving endpoint may choose when to toggle between the first stream 626 and the second stream 636 independent of the camera system 100 (i.e. override the camera system 100) or in combination with the camera system 100. The first stream 626 may transition to the second stream 636, and vice versa, in any desirable manner.

FIG. 12 shows another example in which a view 702 at a transmitting endpoint may be transmitted in a first stream 706 to a first device for display as shown at 708 and in a second stream 716 to a second device for display as shown at 718. In some embodiments, the first endpoint and second endpoint may be two different receiving video displays at two different locations. However, in other embodiments, one of the first device and the second device may be a mobile device and the other may be a video conference display or any other device. If a video conference is being sent to multiple types of devices, the dual stream setup may be advantageous because showing close-ups of the current speaker is almost always preferred to an overview on small devices like phones and tablets, while an overview my be preferred on larger screens, and the preferred video stream may be sent to each device. For example, the overview stream 716 may be sent to a video conference endpoint, as shown at 718, and the close-up view of two participants included in stream 706 may be sent to smaller devices, such as tablets or phones, as shown at 708. Moreover, regardless of the type of device, in some embodiments, sending different streams 706, 716 to different devices may also allow the camera system 100 to provide an overview for every new participant that joins the meeting without interrupting the close-up from an active speaker sent to other receiving endpoints.

Figure 13:
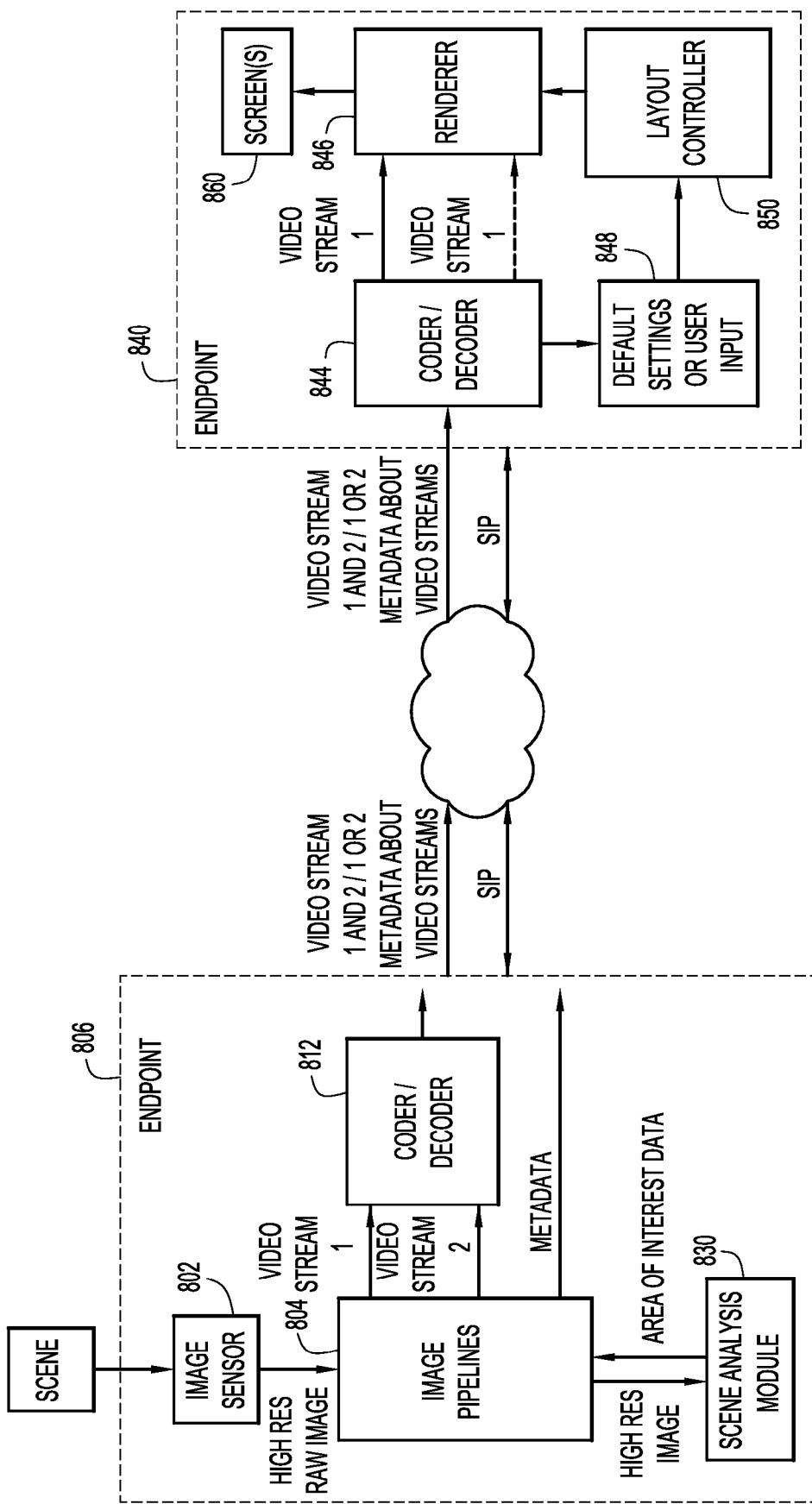
FIG. 13 is a high-level data flow diagram depicting operations performed by the camera system to provide a video stream with metadata, according to example embodiments.

Now referring to FIG. 13, a data flow diagram 800 is shown depicting the dual stream process described above, enhanced with metadata. The data flow diagram 800 is not exhaustive, but highlights the parts most relevant to the dual stream enhanced with metadata. Initially, a scene is captured using one or several camera lens/sensor assembly 802 included in an endpoint 806 and processed in image pipelines 804 based on input from the scene analysis module 830 in the manner described above with regards to FIGS. 6-8 (i.e., video signals are processed in the image pipeline 804, including cropping and scaling based on input from the scene analysis module 830). However, in this embodiment, data describing or characterizing the region of interest can also be sent through the image pipelines 804 such that it may be included with the video stream as metadata. Then, when the video stream is encoded with a coder/decoder 812, the metadata may be packaged with the video stream and sent to a receiving endpoint 840. In some embodiments, the metadata may be sent in a separate channel, e.g. over a representational state transfer (REST)-based channel. The metadata may contain information about the number of streams, the content in each video stream, where people and other objects of interest are in the streams, etc. The metadata may also contain information about the size and number of screens at a site, distance to the audience, etc. In addition, the metadata may contain information about default setup, and available options for users to choose from, such as an overview and a close-up stream.

In some embodiments, the creation of metadata is best done near-end, on high quality video data captured with a camera. However, in other embodiments metadata is created at the receiving endpoint 840. In either case, metadata is created based on video and audio processing, including face detection, body detection, motion detection, object recognition, audio triangulation, depth sensing, etc. At receiving endpoint 840, the metadata information can be used to optimize the layout and composition of video streams, taking into account the size of available screens, distance to spectators, user preferences, etc. For example, when video streams are received with the metadata, the video streams may be decoded with a coder/decoder 844 and begin to be rendered by a renderer 846. However, the rendering provided by the renderer 846 may be impacted by a layout controller 850 that receives settings from input that may be derived from the received metadata. In other words, the metadata may be used to update, edit, or otherwise change the settings of the layout controller 850 which, in turn, may cause the renderer 846 to display the video streams from endpoint 806 in a specific manner. However, the use of metadata does not necessarily require two data streams. In some embodiments, the metadata may ensure that a single stream shows a specific view or crop of a view.

As one specific example, metadata may be used to supplement a lecture mode provided by camera system 100. In lecture mode, the camera system 100 may provide a stream of the presenter and a stream of presentation data. The metadata may contain information about where in the video the lecturer is and ensure that the lecturer is always shown.

There are several advantages to the camera system and related techniques presented herein. As one example, the purely digital PTZ camera presented herein enables fast and flexible speaker tracking, without mechanical wear and tear of components and, thus, provide an unobtrusive near end meeting experience. The purely digital PTZ camera also improves the speaker tracking experience for far end participants, as the far end users do not need to watch the camera rotate into a new position and zoom in. Instead, a new crop can simply be selected and swapped in. As another example, the camera system and techniques presented provide coverage of a wide variety of video conference settings with high image quality. Combining the wide angle camera with several long focus lens cameras in the specific configuration described herein allows the camera system to provide digital PTZ across the relevant parts of a scene, without having to stitch images together. The digital PTZ camera presented herein can also "zoom" in on any portion of a scene, not just the central portion of a scene.

To summarize, in one form, a system is provided comprising: a fixed wide lens camera configured to provide a view of a space and to output a first video signal; a first fixed camera configured to provide a view of a first portion of the space and to output a second video signal; a second fixed camera configured to provide a view of a second portion of the space and to output a third video signal; a third fixed camera configured to provide a view of a third portion of the space and to output a fourth video signal; and a processor operatively coupled to the wide lens camera, the first fixed camera, the second fixed camera, and the third fixed camera, the processor configured to: receive the first video signal, the second video signal, the third video signal, and the fourth video signal; select a relevant video signal from the first video signal, the second video signal, the third video signal, and the fourth video signal; process the relevant video signal by digitally panning, tilting, and zooming the relevant video signal to produce a processed video signal; and output a video stream from the processed video signal.

In another form, a system is provided comprising: a camera assembly configured to provide a view of a space, the camera assembly including: a wide lens camera configured to provide an overall view of the space, and to produce a first video signal; a first long focus lens camera laterally aligned with the wide lens camera and configured to provide a view of a first portion of the space, the first portion being contained within the overall view of the space, and to produce a second video signal; a second long focus lens camera laterally aligned with the wide lens camera and configured to provide a view of a second portion of the space, the second portion overlapping with a first section of the first view and extending beyond the overall view, and to produce a third video signal; and a third long focus lens camera laterally aligned with the wide lens camera and configured to provide a view of a third portion of the space, the third portion overlapping with a second section of the first view and extending beyond the overall view, and to produce a fourth video signal; a sensor configured to detect a tilt angle of the camera subsystem; and a processor configured to: process at least one of the third video signal or the fourth video signal so as to digitally roll the third video signal or the fourth video signal into horizontal alignment with each other based on the tilt angle detected by the sensor; and process the first video signal, second video signal, third video signal and fourth video signal to provide a zoomed-in view of areas or objects in the space.

In still another form, an apparatus is provided comprising: a wide lens camera vertically tilted a first angle with respect to a horizontal plane and configured to provide an overall view of a space; a first long focus lens camera laterally aligned with the wide lens camera and vertically tilted a second angle with respect to the wide lens camera such that the first long focus lens camera is configured to provide a view of a first portion of the space; a second long focus lens camera laterally aligned with the wide lens camera and rotated a third angle about a vertical axis in a first direction with respect to the first long focus lens such that the second long focus lens camera is configured to provide a view of a second portion of the space; and a third long focus lens camera laterally aligned with the wide lens camera and rotated a fourth angle about a vertical axis in a second direction with respect to the first long focus lens camera, the second direction being opposite the first direction, such the third long focus lens camera is configured to provide a view of a third portion of the space, wherein the wide lens camera the first long focus lens camera, the second long focus lens camera, and the third long focus lens camera are fixed within the apparatus.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A system comprising:
  a fixed wide lens camera disposed within a camera housing and configured to provide a view of a space and to output a first video signal;
  a first fixed camera disposed within the camera housing and configured to provide a view of a first portion of the space and to output a second video signal;
  a second fixed camera disposed within the camera housing and configured to provide a view of a second portion of the space and to output a third video signal;
  a third fixed camera disposed within the camera housing and configured to provide a view of a third portion of the space and to output a fourth video signal; and
  a processor operatively coupled to the wide lens camera, the first fixed camera, the second fixed camera, and the third fixed camera, the processor configured to:
    receive the first video signal, the second video signal, the third video signal, and the fourth video signal;
    process the third video signal to horizontally pan approximately half of a field of view of the third video signal;

process the fourth video signal to horizontally pan approximately half of a field of view of the fourth video signal;
select a relevant video signal from the first video signal, the second video signal, the processed third video signal, and the processed fourth video signal;
process the relevant video signal by digitally panning, tilting, and zooming the relevant video signal to produce a processed video signal; and
output a video stream from the processed video signal.

2. The system of claim 1, wherein the processor is configured to determine the relevant video signal from one or more of the first video signal, the second video signal, the processed third video signal and the processed fourth video signal.

3. The system of claim 2, wherein the processor is configured to determine the relevant video signal at predetermined time intervals.

4. The system of claim 2, wherein the processor is configured to determine the relevant video signal based on activity in the space.

5. The system of claim 4, wherein the activity includes at least one of an audio signal and a location of an object of interest.

6. The system of claim 2, wherein the relevant video signal is a first relevant video signal and the processor is further configured to:
determine a second relevant video signal from the first video signal, the second video signal, the processed third video signal and the processed fourth video signal, the second relevant video signal being different from the first relevant signal;
generate a dual stream video stream including a first stream generated based on the first relevant video signal and a second stream generated based on the second relevant video signal.

7. The system of claim 1, wherein the processor is further configured to:
generate metadata based on one or more of the first video signal, the second video signal, the processed third video signal and the processed fourth video signal, wherein the metadata includes information about content in the first video signal, the second video signal, the processed third video signal and the processed fourth video signal.

8. A system comprising:
a camera assembly configured to provide a view of a space, the camera assembly including:
a camera housing;
a wide lens camera disposed within the camera housing and configured to provide an overall view of the space, and to produce a first video signal;
a first long focus lens camera disposed within the camera housing in lateral alignment with the wide lens camera and configured to provide a view of a first portion of the space, the first portion being contained within the overall view of the space, and to produce a second video signal;
a second long focus lens camera disposed within the camera housing in lateral alignment with the wide lens camera and configured to provide a view of a second portion of the space, the second portion overlapping with a first section of the first portion and extending beyond the overall view, and to produce a third video signal; and
a third long focus lens camera disposed within the camera housing in lateral alignment with the wide lens camera and configured to provide a view of a third portion of the space, the third portion overlapping with a second section of the first portion and extending beyond the overall view, and to produce a fourth video signal;
a sensor configured to detect a tilt angle of the camera assembly; and
a processor configured to:
process at least one of the third video signal or the fourth video signal so as to digitally roll the third video signal or the fourth video signal into horizontal alignment with each other based on the tilt angle detected by the sensor; and
process the first video signal, second video signal, third video signal and fourth video signal to provide a zoomed-in view of areas or objects in the space.

9. The system of claim 8, wherein the processor is configured to process the third video signal and the fourth video signal so as to horizontally pan approximately half of a field of view of the third video signal and of the fourth video signal.

10. The system of claim 8, wherein the camera assembly is fixed in position.

11. The system of claim 8, wherein the processor is further configured to:
process the first video signal, second video signal, third video signal and fourth video signal so as to provide a view that tracks objects of interest in the space.

12. An apparatus comprising:
a wide lens camera vertically tilted a first angle with respect to a horizontal plane and configured to provide an overall view of a space;
a first long focus lens camera laterally aligned with the wide lens camera and vertically tilted a second angle with respect to the wide lens camera such that the first long focus lens camera is configured to provide a view of a first portion of the space;
a second long focus lens camera laterally aligned with the wide lens camera and rotated a third angle about a first vertical axis in a first direction with respect to the first long focus lens such that the second long focus lens camera is configured to provide a view of a second portion of the space; and
a third long focus lens camera laterally aligned with the wide lens camera and rotated a fourth angle about a second vertical axis in a second direction with respect to the first long focus lens camera, the second direction being opposite the first direction, such the third long focus lens camera is configured to provide a view of a third portion of the space, wherein the wide lens camera, the first long focus lens camera, the second long focus lens camera, and the third long focus lens camera are fixed within the apparatus.

13. The apparatus of claim 12, wherein the first angle is within a range of approximately 25 degrees in a third direction to approximately 10 degrees in a fourth direction that is opposite the third direction and the second angle is within a range of approximately 10 degrees in the third direction to approximately 10 degrees in the fourth direction.

14. The apparatus of claim 12, wherein the third angle and the fourth angle are each within a range of approximately 20 degrees to approximately 25 degrees and the second long focus lens camera and third long focus lens camera are vertically tilted relative to the wide lens camera within a range of approximately 10 degrees in a third direction to approximately 10 degrees in a fourth direction that is opposite the third direction.

15. The apparatus of claim 12, wherein each of the wide lens camera, the first long focus lens camera, the second long focus lens camera, and the third long focus lens camera is fixed in position.

16. In combination, the apparatus of claim 12 and a video conference endpoint having a display screen, wherein the apparatus is configured to be mounted above or below the display screen of the video conference endpoint.

17. The apparatus of claim 12, further comprising:
a microphone array configured to detect audio in the space.

18. The apparatus of claim 12, wherein the overall view has a field of view of approximately 70 degrees to approximately 120 degrees.

19. The apparatus of claim 18, wherein the first long focus lens camera, the second long focus lens camera, and the third long focus lens camera each have a field of view of approximately 30 degrees to approximately 60 degrees.

20. The apparatus of claim 12, wherein the first portion is contained within the overall view of the space, the second portion overlaps with a first section of the first view and extends horizontally beyond the overall view, and the third portion overlaps with a second section of the first view and extends horizontally beyond the overall view.

\* \* \* \* \*